Patented Aug. 31, 1948

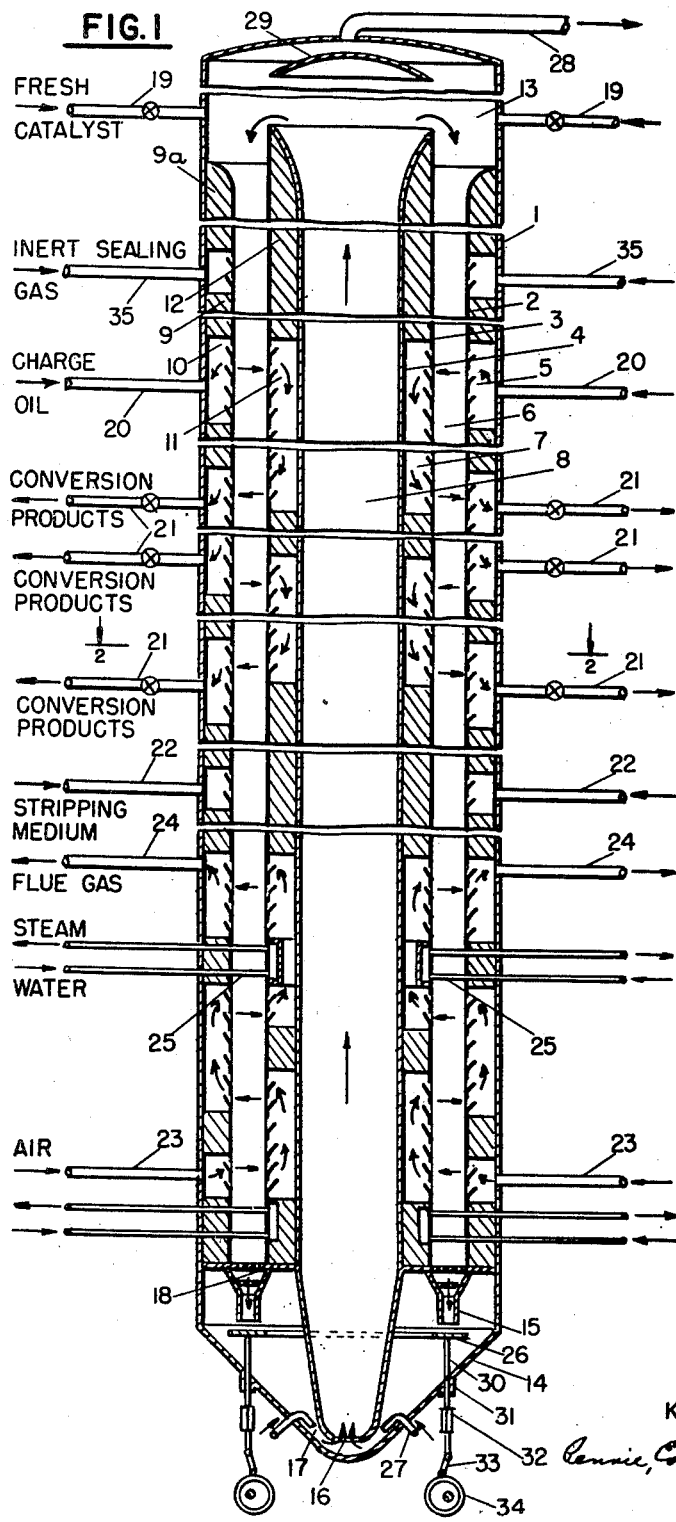
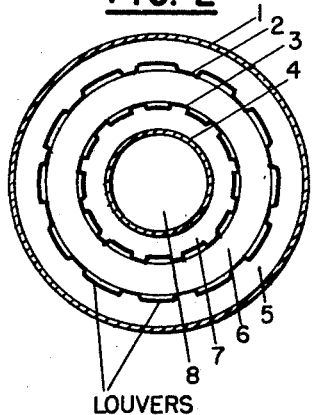

2,448,334

UNITED STATES PATENT OFFICE 2,448,334

PYROLYTIC CONVERSION OF HYDROCARBONS

Kenneth Merle Watson, Madison, Wis., assignor to Sinclair Refining Company, New York, N. Y., a corporation of Maine Application June 27, 1947, Serial No. 757,641

2 Claims. (Cl. 196—52)

This invention relates to the pyrolytic conversion of hydrocarbons and, more particularly, to pyrolytic conversion processes involving the use of a solid catalyst.

In such operations, a carbonaceous deposit is formed on the solid catalyst during the hydrocarbon conversion and the catalyst must be periodically regenerated to restore its catalytic effectiveness.

In one method of operation previously proposed, the hydrocarbons to be converted are passed continuously upwardly through a downwardly gravitating bed of catalyst, in granular or pelleted form, in a vertically elongated conversion chamber of large transverse dimensions, the catalyst being continuously withdrawn from the lower end of the chamber, regenerated, and returned to the upper end of the chamber. The regeneration is effected by burning off the carbonaceous deposit by passing the hot catalyst downwardly through a similar vertically elongated chamber countercurrent to a stream of air.

Such operations have entailed expensive and troublesome mechanical elevator means for conveying the catalyst from the lower end of the conversion chamber to the top of the regenerating chamber and again from the lower end of the regenerating chamber to the top of the conversion chamber. Difficulties have also been experienced in effecting uniform contact between the hydrocarbon vapors and the catalyst by reason of the tendency of the vapors to channel upwardly through the bed of catalyst. Similar difficulties have been experienced in the regeneration of the catalyst. The present invention provides an improved method of operation whereby these difficulties are avoided.

I have described and claimed in my copending applications Ser. Nos. 757,639 and 757,646, filed June 27, 1947, an improved process and apparatus, respectively, in which the catalyst, at an elevated temperature, is caused to gravitate as a continuous vertically elongated bed or column downwardly through a vertically elongated chamber having at least one relatively narrow horizontal dimension. The catalyst is passed from the bottom of the column into a stream of hydrocarbon vapors to be processed and is caught up by the vapors and carried in suspension upwardly into an enlarged chamber positioned at an elevation higher than the upper end of the vertically elongated catalyst bed and in which the catalyst drops out of suspension and flows therefrom by gravity onto the upper end of the catalyst bed.

The hydrocarbon vapors separated from the catalyst pass from the enlarged chamber and are repeatedly passed back and forth through the upper portion of the hot catalyst bed at progressively different elevations, whereby conversion of the hydrocarbons is effected with the resultant deposit of carbonaceous material on the catalyst. Air, or other oxidizing gas, is similarly passed back and forth through the lower portion of the hot catalyst bed, with a resultant burning off from the catalyst of the carbonaceous deposit formed thereon by the hydrocarbon conversion in the upper portion of the column. The regenerated catalyst is withdrawn from the lower portion of the chamber, suspended in hydrocarbon vapors and returned to the upper end of the catalyst bed, as just described.

In my copending applications, Ser. Nos. 757,640 and 757,647 filed June 27, 1947, I have described and claimed an advantageous modification of the said process and apparatus in which the catalyst is only partially regenerated in the lower portion of the vertically elongated column and is passed therefrom to a separate regenerating chamber in which residual carbon is burned from the catalyst and from which the regenerated catalyst flows into a stream of hydrocarbon vapors to be processed and is carried thereby in suspension into an enlarged chamber positioned at an elevation higher than the upper end of the vertically elongated catalyst bed, as just described.

The present invention provides a further advantageous modification of the invention in which the catalyst is partially regenerated in the lower zone of the vertically elongated body of catalyst and the regeneration is completed and the fully regenerated catalyst returned to the upper end of the catalyst body by suspending the partially regenerated catalyst in a stream of air flowing upwardly through a second vertically elongated chamber, advantageously in heat exchange relation with the partial regeneration and reaction zones. The catalyst is separated from the suspension in an enlarged chamber positioned above the upper end of the vertically elongated catalyst bed, as just described, and the flue gases pass out from the enlarged chamber carrying therewith in suspension catalyst fines formed by attrition of the catalyst in its repeated cycling through the system.

The present invention thus provides improved means of removing catalyst fines and of conserving the maximum amount of heat for useful purposes, and it also results in the conversion of the amount of air supplied. Where the secondary regeneration is carried out in heat exchange relation with the reaction zone, improved uniformity of temperature conditions in the reaction zone is attained by minimizing the temperature gradient. Further, the invention provides greater simplicity of operation and greater simplicity and compactness of apparatus requirements.

Heat for effecting the conversion is supplied in large measure by the burning of the carbonaceous deposit. Additional heat may be supplied where required by preheating the hydrocarbon charge oil vapors.

The hydrocarbon vapors to be converted may be passed through the catalyst bed at progressively higher or progressively lower levels, that is, in a generally countercurrent, or generally concurrent, direction with respect to the direction of catalyst flow. Similarly, air for the partial regeneration of the catalyst may be passed through the lower portion of the catalyst bed at progressively higher, or progressively lower levels. Due precaution should be taken, however, to minimize intermixing of the gases and vapors.

In a particularly advantageous method of operation, in accordance with my invention, the hydrocarbon vapors are repeatedly passed through the column of catalyst at progressively lower levels in the upper portion of the catalyst bed and the primary air is passed through the catalyst at progressively higher levels in the lower portion of the catalyst bed. By this procedure, a zone of lower pressure is created at the intermediate portion of the bed, both with respect to the conversion section and the partial regenerating section, and the tendency for the gases and vapors to become intermixed is minimized. It is also particularly advantageous to inject an inert sealing gas into the zone intermediate the conversion and partial regeneration sections. This serves, further, to prevent mixing of combustion gases and hydrocarbon vapors and also serves as a stripping medium for stripping from the spent catalyst readily vaporizable hydrocarbons.

A large amount of heat is liberated in the burning of the carbonaceous deposit and care should be exercised to avoid over-heating of the catalyst. It is frequently advantageous to extract heat from the bed of catalyst undergoing regeneration in an amount sufficient to avoid excess temperatures. For this purpose, cooling coils may, with advantage, be provided in the primary regenerating zone and water, or other cooling fluid circulated therethrough.

Further catalyst fines are frequently formed by attrition of the catalyst during repeated circulation of the system and it is usually desirable to remove these fines to avoid their excessive accumulation. In my present process, the catalyst fines are carried off in suspension in the flue gases from the secondary regeneration.

By proper control of the rate of downward flow of the catalyst bed and coordinating therewith the rate of flow and number of passes of the hydrocarbon vapors and primary regenerating air therethrough, the catalyst will be substantially spent and ready for regeneration by the time it reaches the lower end of the reaction zone and will be largely regenerated upon reaching the lower end of the primary regenerating zone.

The optimum rate of downward flow of the catalyst bed will depend primarily upon the type of catalyst employed, the type of hydrocarbon being converted, operating temperatures, the rate of hydrocarbon feed, the extent of the required reaction, the depth of cracking, for instance, the number of passes through the catalyst and the thickness of the catalyst bed. The optimum rate of catalyst flow for any particular operation is readily determinable by simple test and is, with advantage, controlled by regulation of the flow of catalyst from the lower end of the primary regenerating zone by means of a suitable valve arrangement.

The process is applicable to various types of hydrocarbon conversion and contemplates the use of various solid catalyst in granular or pelleted form. However, the invention will be more particularly described and illustrated with reference to the accompanying drawing, which represents somewhat conventionally an embodiment of the invention in a catalytic cracking process carried out in a particularly advantageous type of apparatus, subject of my copending application, Ser. No. 757,648, filed concurrently herewith, in which the bed or column of catalyst is in the form of a vertically elongated annulus.

Figure 1 of the drawings represents a vertical sectional and somewhat fragmentary view of the apparatus, indicating intervening sections of similar design, and Figure 2 is a horizontal sectional view along the line 2—2 of Figure 1.

The apparatus is enclosed by a cylindrical casing 1, advantageously of sheet metal, and closed at its upper end. Coaxially positioned in casing 1 are cylindrical casings 2, 3 and 4 of progressively smaller diameters which, together with the outer casing form annular chambers 5, 6 and 7 and an interior cylindrical chamber 8. The intermediate annulus 6 and the interior chamber 8 are substantially unobstructed for their entire height. The outer annulus 5 is completely obstructed by a plurality of vertically spaced partitions or spacers 9 of considerable depth, forming a plurality of vertically spaced chambers 10. The inner annulus 7 is similarly divided into a plurality of vertically spaced chambers 11 by similar partitions or spacers 12.

Each of the chambers 10 and 11 communicate with the annulus 6 through louvers, the slats of which project upwardly and outwardly from the annulus 6 into the respective chambers.

The casings 2, 3 and 4 terminate short of the upper end of the cylinder formed by casing 1 so as to form an enlarged cylindrical chamber 13 in the upper part of the apparatus. The uppermost chamber 10 is closed at its upper end by a partition 9a, similar to spacers 9. The annulus 6 is in open communication at its upper end with the lower portion of chamber 13. The upper end of the uppermost chamber 11 is closed by means of the partition 12. The upper end of the inner chamber 8 is shown as flaring outwardly and is in open communication with enlarged chamber 13.

The outer casing 1 projects downwardly below the lower ends of the other casings and terminates in hopper 14. The lower ends of the annular chamber 6 opens into hopper 14 through an annular connection 15. The walls of the chamber 8 are projected downwardly toward the bottom of hopper 14, the chamber 8 opening into the hopper at 16 and the lower end thereof is so shaped and so positioned with respect to the bottom of the hopper 14 as to form a restricted annular passage 17 between the lower end of the wall of chamber 8 and the bottom of the hopper 14. The lower end of annulus 6 is interiorly provided with a plurality of horizontally distributing plates 18, these plates being perforated in staggered relationship so as to retard the downward flow of catalyst therethrough, as understood in the art. Only two such plates are shown in the drawing but it will be understood that a greater number may be used in accordance with conventional practice.

The spacers or partitions 9 and 12 are, with advantage, positioned somewhat as shown in the drawing, so as to form chambers 10 and 11 in staggered positions such that the lower end of a given chamber 10 is directly opposite the upper end of the next lower chamber 11 and the lower end of said chamber 11 is directly opposite the upper end of the next lower chamber 10. An exception to this arrangement are the stripping zones presently to be described.

The spacers 9, 9a and 12 are, for clarity, shown in the drawing as solid sections, but it will be understood that they may be either solid or hollow. Further, for reduction in weight and material used in fabrication, the respective casings 1 and 4 may be discontinuous at the points of the respective spacers.

In operation, the annulus 6 is filled with granular catalyst, for instance, by charging the catalyst into the upper enlarged zone 13 through valved conduits 19. Vaporized hydrocarbon oil to be processed is charged through lines 20 into an upper chamber 10 and, from thence, the vapors pass by way of the louvers through the body of catalyst in annulus 6 and into the upper end of the uppermost chamber 11.

From the lower portion of said chamber 11, the vapors pass back and through the body of catalyst into the next lower chamber 10 and so back and forth through the body of catalyst at progressively lower elevations until the vapors reach an intermediate zone 10 from which they are withdrawn through one of the valved lines 21 to fractionating apparatus, not shown.

In the drawing a plurality of conversion product drawoff lines 21 are shown leading from progressively lower chambers 10. This is advantageous as it permits withdrawal of conversion products at selective levels from the reaction zone thereby varying the space velocities of the operation and also varying the depth of the intermediate sealing and stripping zone, subsequently described.

The catalyst, which has been substantially spent, continues downwardly through annulus 6 and is stripped of readily vaporizable hydrocarbons remaining thereon by stripping gas, or vapor, steam for instance, introduced into a still lower chamber 10 through lines 22.

Air is passed into the lowermost chamber 10 through lines 23, passes therefrom through the louvers, through the bed of catalyst, into the lowermost chamber 11 and back through the catalyst into the next higher chamber 10 and so back and forth through the catalyst at progressively higher levels until it reaches an intermediate chamber 10, below that into which the stripping medium is injected, and the flue gases pass therefrom through conduits 24 to a stack, not shown in the drawing.

The air passing in contact with the hot catalyst results in the burning therefrom of the major portion of the carbonaceous deposit formed on the catalyst during the hydrocarbon conversion. Excess heat may be extracted from the catalyst undergoing regeneration by means of cooling coils 25, extending through the bed of catalyst in annulus 6 and through which a cooling medium is circulated. For instance, water may be circulated through the cooling coils and thereby converted into steam. Any number of cooling coils required may be used to extract from the catalyst an amount of heat necessary to prevent excessive temperatures.

The partially regenerated catalyst passes from the lower end of the regenerating zone through perforations in the series of plates 18, so positioned as to permit the flow of catalyst therefrom at a retarded rate, dependent upon the angle of repose of the catalyst as previously noted and as understood by the art. From thence, the catalyst flows through the annular connection at the lower end of annulus 6, past valve 26, and falls into the hopper 14.

Air for burning the residual carbon from the catalyst is injected into hopper 15 through lines 27 and passes at relatively high velocity through the restricted annular passage 17 where it picks up the partially regenerated catalyst and carries it in suspension upwardly through the opening 16 and the elongated chamber 8.

In passing upwardly through chamber 8, residual carbon is burned from the catalyst by contact, at high temperature, with the air and the regenerated catalyst is carried upwardly into enlarged chamber 13 where, by reason of decreased velocity of the gaseous suspension, the catalyst drops out of the flue gases and forms a bed of catalyst in the enlarged chamber from which the catalyst flows by gravity onto the elongated body of catalyst in annulus 6, maintaining the annulus completely filled with catalyst.

The flue gases pass from the enlarged chamber through conduit 28 to a precipitator, or stack, not shown and carry therewith in suspension from the system the catalyst fines. The separation of the catalyst from the flue gases is aided and also wear on the apparatus lessened by replaceable baffle 29 positioned in the enlarged chamber 13 above the upper end of the chamber 8. The separation and even distribution of the separated catalyst in chamber 13 is, with advantage, further facilitated by the gradual increase in transverse area of the chamber 8 near its upper end.

In the apparatus shown, the secondary regeneration of the catalyst is effected in heat exchange relationship with the gases and vapors in the several chambers 11. This is particularly advantageous with respect to the hydrocarbon vapors in the reaction zone where the reaction is endothermic. In an operation of the type described, heat for the reaction is supplied primarily through the hot regenerated catalyst and, as the reaction proceeds, there is a tendency toward a lowering of the reaction temperature. By passing the hot flue gases in heat exchange relation with the hydrocarbon vapors, particularly in generally countercurrent relationship as shown, the temperature gradient in the reaction zone is lessened and more active, uniform conversion is effected. The secondary air is, with advantage, supplied to hopper 14 through a multiplicity of tubes 27, so as to give substantially uniform distribution of air passing through the restriction 17. The restriction 17 functions somewhat as the throat of a venturi and the rate of passage of air therethrough influences the rate of flow of the catalyst upwardly through the secondary regeneration zone 8. Other catalyst entraining methods may be employed.

The rate of flow of the catalyst through annulus 15 is controlled by a valve mechanism comprising an annular flat ring member 26 of somewhat greater width than annulus 15. This ring 26 is adjustably supported by a plurality of shafts 30, extending downwardly through the wall of the hopper 14 and sealed by suitable glands, indicated on the drawing at 31. The length of the shafts 30 may be adjusted by means of turn buckles 32 and, further, the lower end of the shafts is connected by linkages 33 to eccentrics 34. The eccentrics are connected by suitable conventional means, not shown, so they will operate together to impart an oscillatory movement to ring 26, adjustments in leveling the ring 26 and of its distance from the lower end of annulus 15 being made by the turn buckles 32 interposed in shafts 30.

In the valve arrangement shown, the ring 26 will completely shut off the flow of catalyst without requiring mechanical seating of the valve. By raising the ring to a point where its edges intercept the angle of repose of the catalyst flowing from annulus 15, the flow is completely stopped. This method of flow control is particularly advantageous as it avoids crushing the catalyst. The rate of catalyst flow is determined by the height of the ring and the oscillatory motion maintains uniform flow at all points around the annulus 15.

The extent of the regeneration in the primary regenerating zone is subject to considerable variation and is dependent primarily upon the rate of catalyst flow through the annulus 6, the amount of air used and the number of passes of the air through the catalyst. It will also depend upon the thickness of the annulus 6. The amount of secondary regeneration air should be, at least, sufficient to carry the catalyst upwardly in suspension at the desired rate and will depend primarily upon the rate of catalyst circulation, the size and density of the catalyst and the transverse area of the chamber 8. Usually, the velocity of the gases passing upwardly through chamber 8 should be within the range of 5 to 30 feet per second, the optimum velocity being dependent in large measure upon other conditions, just noted.

The thickness of the annulus 6 may be varied over a considerable range, the optimum thickness dependent upon the particular operating conditions. Generally, its thickness is, with advantage, about 1 to 2 feet. The depth of the spacers 9 and 12 is, with advantage, considerably greater than the thickness of the bed of catalyst in annulus 6 so as to minimize any tendency of the gases or vapors to pass from one chamber to that immediately above or below it, rather than through the catalyst bed to the opposite chamber.

For convenience, the vertical spacings between the outer and inner annular chambers, respectively, are shown in some instances in the drawing as only slightly greater than the thickness of the catalyst bed in annulus 6. It will be understood that the spacings are not intended to be drawn to scale and are, with advantage, of greater relative dimension than shown in the drawing, advantageously being considerably greater than the thickness of the catalyst bed, as previously noted.

With the exception of the products of combustion, some by-passing of the gases or vapors from one zone to the next higher or lower zone does not seriously interfere with the operation. However, mixing of combustion gases from the regenerating zone with the hydrocarbon vapors should usually be avoided and, for this reason, it is particularly advantageous that the spacing just above the regenerating zone be substantially greater than the horizontal path through the catalyst bed.

To avoid contamination of the hydrocarbon vapors with the flue gases from the secondary regeneration zone, an inert sealing gas is, with advantage, injected into the uppermost zone 10 through conduits 35. The sealing gas passes through the louvers of chamber 10 into the body of catalyst gravitating downwardly from chamber 13. This gas should be introduced at such a rate that the pressure in the sealing zone is higher than the pressure in chamber 13 and also higher than the pressure in the zone below into which the charge oil is introduced. There should be sufficient length of solid catalyst bed in chamber 6 between the point of introduction of the sealing gas and chamber 13, and also between the point of introduction of the sealing gas and the point of introduction of the charge oil vapors, to permit maintainence of such pressure differential without excessive flow of sealing gas in either direction.

The apparatus shown in the drawing provides for four to six passes of hydrocarbon vapors and four passes of the primary regeneration air through the catalyst bed. Frequently a greater number of passes is desirable and is within the contemplation of my invention. Figure 1 of the drawing is somewhat fragmentary indicating intervening sections of the apparatus of similar design.

The injection of sealing or stripping gas between the conversion and primary regenerating zones may frequently be omitted, particularly when the amount of air passed through the primary regenerating zone is so controlled that, upon reaching the upper end of the primary regenerating zone, the combustion gases are substantially free from uncombined oxygen. Under such conditions, the hot inert combustion products will serve to strip the spent catalyst and a portion of the combustion gases may be permitted to pass upwardly through the stripping zone into the conversion zone by imposing a slight back-pressure on the effluent gases.

The invention contemplates the use of various types of catalyst, for instance, natural or synthetic earths, silica gels and the like, or various inert carriers having active catalyst deposited thereon; the size of the particles of the catalyst is, with advantage, of a mesh within the range of 25 to 40, though catalyst of larger or smaller particle size may be employed. Pelleted catalyst as coarse as 4 to 10 mesh may be employed. Usually, powdered catalyst, such as used in the fluid catalyst processes, is less desirable because of a tendency of the catalyst particles to be carried out of the catalyst bed along with the gases and vapors, but may be used in conjunction with relatively low gas and vapor velocities through the catalyst bed. Where such finely divided catalyst is used, means should be provided for returning to chamber 13 the larger particles thereof carried off with flue gases.

Operating conditions are generally subject to considerable variation depending upon the particular catalyst employed, and the nature and the extent of the desired reaction. In cracking gas oil, for instance, using a silica-alumina type catalyst, the temperature in the reaction zone is, with advantage, maintained within the range of 750 to 950° F. and the pressure within the range of from 10 to 15 pounds per square inch. In the regenerating zone, a temperature within the range of 900 to 1150° F. is usually satisfactory.

The temperature in the reaction zone is controlled, in large measure at least, by the temperature of the catalyst passing from the lower end of the primary regenerating zone and the extent of preheat of the charge oil. The temperature of the catalyst undergoing regeneration is controlled by the extraction of heat therefrom, as previously described, any desired number of cooling coils being used for this purpose. Danger of over-heating of the catalyst in the secondary regeneration zone is minimized by the burning of the major portion of the carbonaceous deposit in the primary regenerating zone.

By the present process, the extent of contact between the catalyst and the hydrocarbon vapors being converted and also the catalytic activity of the catalyst by which the hydrocarbon vapors are brought into contact may be maintained extremely uniform. Further, an exceptionally uniform and complete regeneration of the catalyst is attained. The process has the advantage of high uniformity of the product, increased catalyst life and catalytic effectiveness, increased economy of operation by reason of the elimination of mechanical elevations and also a closer control of operating conditions.

I claim:

1. In a process for the pyrolytic conversion of hydrocarbons wherein the hydrocarbons in vapor phase are continuously passed in intimate contact with a solid catalyst at an elevated temperature, resulting in the formation of a carbonaceous deposit on the catalyst, and in which the catalyst is intermittently regenerated by burning off the carbonaceous deposit by contact with air, the improvement which comprises passing the catalyst in a relatively narrow, vertically elongated body downwardly through an enclosed vertically elongated chamber, effecting the conversion of the hydrocarbons by repeatedly passing the hydrocarbon vapors transversely through the body of catalyst in an upper zone of the chamber at progressively different elevations, and thereafter separating the hydrocarbon vapors from the catalyst, partially regenerating the catalyst by continuously and repeatedly passing regenerating air transversely through the body of catalyst in a lower zone of the chamber at progressively different elevations and withdrawing the gaseous products of the regeneration from the system, withdrawing partially regenerated hot catalyst from the lower end of the chamber, suspending it in a current of air and passing the suspension upwardly through a second vertically elongated chamber to an elevation higher than the upper end of the vertically elongated body of catalyst, burning residual carbon from the catalyst during its upward passage in suspension in the air, separating the regenerated catalyst from the resultant gaseous combustion products and returning it by gravity to the upper end of the catalyst bed and withdrawing the gaseous combustion products from the system.

2. In a process for the pyrolytic conversion of hydrocarbons wherein the hydrocarbons in vapor phase are continuously passed in intimate contact with a solid catalyst at an elevated temperature, resulting in the formation of a carbonaceous deposit on the catalyst, and in which the catalyst is intermittently regenerated by burning off the carbonaceous deposit by contact with air, the improvement which comprises passing the catalyst in a relatively narrow, vertically elongated body downwardly through an enclosed vertically elongated chamber, effecting the conversion of the hydrocarbons by repeatedly passing the hydrocarbon vapors transversely through the body of catalyst in an upper zone of the chamber at progressively different elevations, and thereafter separating the hydrocarbon vapors from the catalyst, partially regenerating the catalyst by continuously and repeatedly passing regenerating air transversely through the body of catalyst in a lower zone of the chamber at progressively different elevations and withdrawing the gaseous products of the regeneration from the system, withdrawing partially regenerated hot catalyst from the lower end of the chamber, suspending it in a current of air and passing the suspension upwardly through a second vertically elongated chamber, in heat exchange relation with the first said vertically elongated chamber, to an elevation higher than the upper end of the vertically elongated body of catalyst, burning residual carbon from the catalyst during its upward passage in suspension in the air, separating the regenerated catalyst from the resultant gaseous combustion products and returning it by gravity to the upper end of the catalyst bed and withdrawing the gaseous combustion products from the system.

KENNETH MERLE WATSON.

REFERENCES CITED

The following references are of record in the file of this patent:

UNITED STATES PATENTS

| Number | Name | Date |
|---|---|---|
| 2,317,379 | Hemminger | Apr. 27, 1943 |
| 2,344,449 | Ogorzaly | Mar. 14, 1944 |
| 2,376,365 | Lassiat | May 22, 1945 |
| 2,378,342 | Voorhees et al. | June 12, 1945 |
| 2,417,393 | Evans | Mar. 11, 1947 |
| 2,418,679 | Utterback | Apr. 8, 1947 |